United States Patent
Das et al.

(10) Patent No.: US 7,342,916 B2
(45) Date of Patent: Mar. 11, 2008

(54) METHOD, APPARATUS AND SYSTEM FOR OPTIMIZING ROUTING OF MOBILE IP PACKETS

(75) Inventors: Kaustubh Das, Hillsboro, OR (US); Changwen Liu, Portland, OR (US); Prakash Iyer, Beaverton, OR (US); Hani Elgebaly, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 866 days.

(21) Appl. No.: 10/660,284

(22) Filed: Sep. 10, 2003

(65) Prior Publication Data

US 2005/0053054 A1 Mar. 10, 2005

(51) Int. Cl.
*H04L 12/28* (2006.01)
*G06F 15/173* (2006.01)

(52) U.S. Cl. ............... 370/351; 370/392; 370/400; 709/242

(58) Field of Classification Search .............. 370/351, 370/389, 400, 401, 392, 474; 709/242
See application file for complete search history.

(56) References Cited

U.S. PATENT DOCUMENTS

| 6,366,961 | B1* | 4/2002 | Subbiah et al. | 709/238 |
| 6,970,943 | B1* | 11/2005 | Subramanian et al. | 709/238 |
| 6,973,057 | B1* | 12/2005 | Forslow | 370/328 |
| 7,079,499 | B1* | 7/2006 | Akhtar et al. | 370/310 |

* cited by examiner

*Primary Examiner*—Wing Chan
*Assistant Examiner*—Hong Sol Cho
(74) *Attorney, Agent, or Firm*—Michael R. Barre

(57) ABSTRACT

Network devices on mobile networks may be configured to improve and optimize packet processing and routing. Specifically, a home agent device may be decomposed into its major functionality, namely processing and routing. Various processors on the device are assigned to specific tasks and each processor may be optimized for its specific tasks, thus improving packet processing and routing. The home agent device may comprise one or more physical components.

21 Claims, 5 Drawing Sheets

METHOD, APPARATUS AND SYSTEM FOR OPTIMIZING ROUTING OF MOBILE IP PACKETS

FIELD OF THE INVENTION

The present invention relates to the field of mobile computing, and, more particularly to a method, apparatus and system for optimizing the processing and routing of mobile IP packets.

BACKGROUND OF THE INVENTION

Use of mobile computing devices (hereafter "mobile nodes") such as laptops, notebook computers, personal digital assistants and cellular telephones is becoming increasingly popular today. These mobile nodes enable users to move from one location to another ("roam"), while continuing to maintain their connectivity to the same network. In order to roam freely, networks typically conform to one or more industry-wide mobile IP standards. More specifically, the Internet Engineering Task Force ("IETF") has promulgated roaming standards (Mobile IPv4, IETF RFC 3344, August 2002, hereafter "Mobile IPv4," and Mobile IPv6, IETF Mobile IPv6, Internet Draft draft-ietf-mobileip-ipv6-24.txt (Work In Progress), June 2003, hereafter "Mobile IPv6") to enable mobile node users to move from one location to another while continuing to maintain their connectivity to the same network.

Mobile networks typically include various network components to enable packet routing. Many of these network components may not be currently optimized for mobile IP roaming.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for optimizing mobile computing. More specifically, embodiments of the present invention provide a method, apparatus and system for configuring network components on a mobile network to optimize the various functionalities provided by the network components.

Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
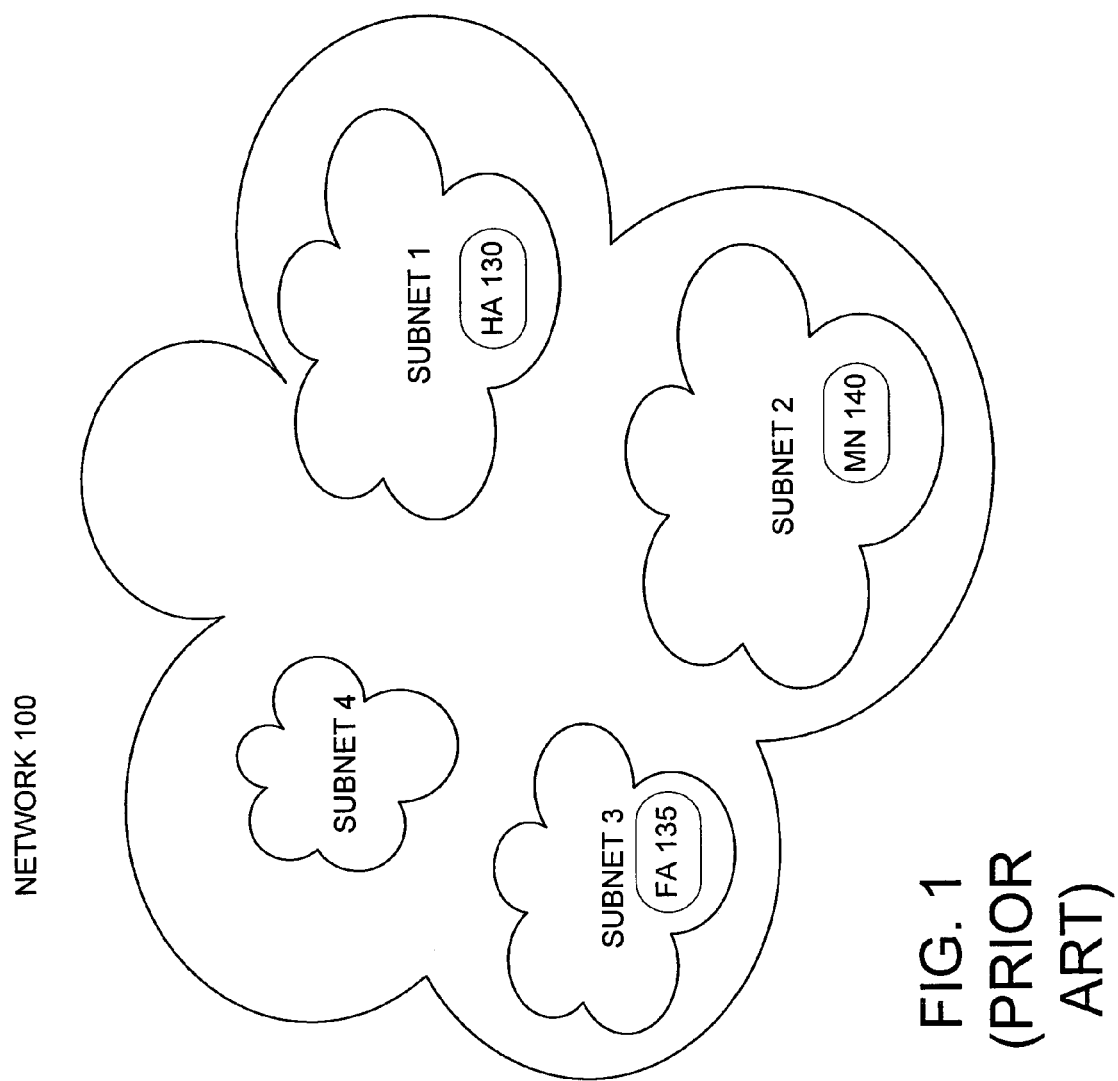
FIG. 1 illustrates a known corporate intranet structure.

To facilitate an understanding of embodiments of the present invention, the following presents an overview of a current mobile IP-compliant network (e.g., a corporate intranet), including various components typically found in such a network. More specifically, as illustrated in FIG. 1, such a known network ("Network 100") structure may include both wired and wireless networks and may comprise multiple subnets. Subnets refer to portions of networks that may share the same common address format, typically the prefix field. For example, on a Transport Control Protocol/Internet Protocol ("TCP/IP") network, all subnets may use the same first three sets of numbers (such as 100.10.10).

Mobile nodes that conform to mobile IP standards may currently roam freely across subnets on Network 100. Thus, for example, when a mobile node ("MN 140") exits its home subnet (Subnet 1), it may continue to maintain its current transport connections and constant reachability in one of two ways. In the first scenario, MN 140 may register with a home agent ("HA 130") when it exits its home subnet. During the registration process, MN 140 informs HA 130 of MN's "care-of address" (hereafter "COA"), namely MN's address on its new subnet (Subnet 2). HA 130 thereafter intercepts all IP packets addressed to MN 140 and reroutes the packets to MN's COA. As MN 140 moves from one subnet to another, MN 140 may obtain new co-located COAs via Dynamic Host Configuration Protocol ("DHCP") or other mechanisms (e.g., pre-assigned COAs, auto-configuration, etc.). To ensure that HA 130 is able to properly route packets to MN 140, MN 140 must continuously update HA 130 with its new COA as it roams on Network 100.

Alternatively, in Mobile IPv4-compliant networks, to conserve addresses, when MN 140 leaves its home subnet, it may register with HA 130 via a foreign agent ("FA 135") on MN 140's new ("foreign") subnet. By registering with FA 135, MN 140 may use FA 135's IP address as its COA when registering with HA 130. In this scenario, HA 130 continues to intercept all packets addressed to MN 140, but these packets are now rerouted to FA 135, namely MN 140's COA as provided to HA 130. FA 135 examines all packets it receives, and sends the appropriate ones to MN 140 at its current location on the foreign subnet. HAs and FAs are well known to those of ordinary skill in the art and further descriptions of such elements are omitted herein in order not to unnecessarily obscure embodiments of the present invention.

Mobile IPv6 networks do not currently define the notion of FAs because IPv6 provides sufficient addresses. Thus, the following description describes and focuses on the functionality of HA 130, but embodiments of the present invention may be equally applicable to FA 135. In other words, any reference to "HA" and/or "HA 130" hereafter shall also be applicable to foreign agents, with minor modifications that will be readily apparent to those of ordinary skill in the art.

HA 130 performs and/or manages two major functions on Network 100 (or any other mobile network), namely mobile node location management (conceptually performed by a "control plane") and network packet routing (conceptually performed by a "forwarding plane."). More specifically, the "control plane" may include management applications and signaling modules, while the "forwarding plane" may provide all network packet routing functionality. Currently, the tasks associated with each of these functions are performed and/or managed by the same piece of hardware and software located in the single physical entity (HA 130) without any distinct separation and/or optimization for processing. In other words, current HAs are not designed to optimize the tasks associated with each of these functions.

Figure 2:
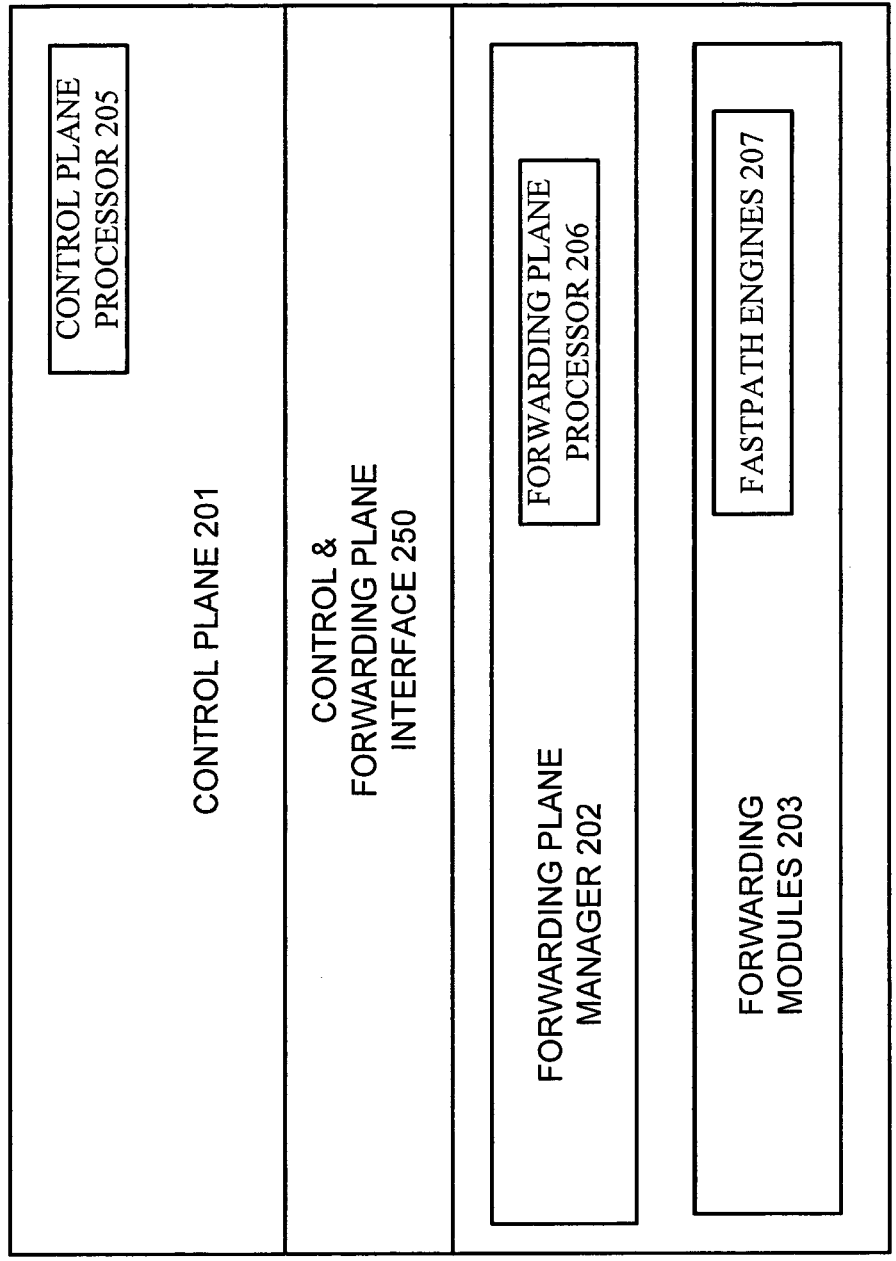
FIG. 2 illustrates conceptually the planes in a network device according to embodiments of the present invention.

Embodiments of the present invention optimize HA 130 to facilitate more efficient packet processing and routing on mobile IP networks. More specifically, according to an embodiment, HA 130 is decomposed into logical control and forwarding planes configured to more efficiently process and route mobile IP packets. FIG. 2 illustrates the typical conceptual "planes" in HA 130 according to embodiments of the present invention, namely "Control Plane 201", and "Forwarding Plane 204" having an interface coupling the planes (illustrated as "Control and Forwarding Plane Interface 250"). Control and Forwarding Plane Interface 250 may enable Control Plane 201 and Forwarding Plane 204 to communicate and coordinate packet processing and routing. In one embodiment, Forwarding Plane 204 may be further conceptually separated into "Forwarding Plane Manager 202 (serviced by a Forwarding Plane Processor 206, e.g., an Intel XScale™ processor)" and "Forwarding Modules 203" (serviced by one or more fastpath parallel processing engines ("Fastpath Engines 207"), e.g., Intel IXP™ 2400 processors). Control Plane 201 functionality may be provided by a variety of processors including Intel IA32™, Intel XScale™ and/or IA64™ processors ("Control Plane Processor 205"). It will be readily apparent to those of ordinary skill in the art that various other processors may also be utilized without departing from the spirit of embodiments of the present invention.

According to one embodiment of the present invention, Control Plane Processor 205, Forwarding Plane Processor 206 and Fastpath Engines 207 may be selected according to the type of functions performed by each. Specifically, Control Plane Processor 205 may perform the more infrequent, but most complex administrative and management tasks for HA 130, thus warranting robust processors. On the other end of the scale, Fastpath Engines 207 may perform the most frequent, least complex processing, e.g., all incoming and outgoing packets are received and transmitted by Fastpath Engines 207. These processors may not require significant processing capabilities, but in one embodiment, these processors are extremely fast and efficient at receiving and transmitting packets. Forwarding Plane Processor 206 may perform an intermediate level of processing, typically communicating the Control Plane Processor 205 to request and transmit information to provide Fastpath Engines 207 with all the necessary information to properly route packets. Control Plane Processor 205 may also manage the sequence of functions and the chain of processing performed by Fastpath Engines 207. These processors do not perform tasks as complex as the Control Plane Processor 205, but do perform more complex tasks than Fastpath Engines 207, thus requiring intermediate processing capabilities. By distinctly separating the tasks performed by each processor in the manner described below, embodiments of the present invention enable significant performance improvements in network packet processing, as well as facilitate highly scalable network architectures, as described in further detail below. It will be apparent, however, to those of ordinary skill in the art that these various processor components may co-exist on a single motherboard and/or within the same chipset without departing from embodiments of the present invention.

In one embodiment, Control Plane 201 includes Control Plane Processor 205. Control Plane Processor 205 may accept and/or validate mobile IP binding update messages, and/or add and/or delete entries in Binding Caches in response to binding update messages. Control Plane Processor 205 may also delete binding cache entries from Binding Caches in response to expired lifetimes for these bindings. In an embodiment, Control Plane Processor 205 may communicate a variety of information to Forwarding Plane 204. For example, Control Plane Processor 205 may communicate additions and deletions from a Binding Cache by means of a control interface. Control Plane Processor 205 may also communicate messages via a control interface to initiate and/or abort Proxy Neighbor Advertisements in response to additions and/or deletions from Binding Caches. Proxy Neighbor Advertisements are well known to those of ordinary skill in the art and further description of such is omitted herein in order not to unnecessarily obscure the present invention. According to one embodiment, Control Plane Processor 205 may also be responsible for select security and discovery functions. Finally, Control Plane Processor 205 may be responsible for HA discovery functions, i.e., it may process requests from mobile nodes attempting to discover their home agents.

In one embodiment, Forwarding Plane 204 includes Forwarding Plane Processor 206 and Fastpath Engines 207. Forwarding Plane Processor 206 may be responsible for all communications between Forwarding Plane 204 and Control Plane Processor 205. According to one embodiment of the present invention, Forwarding Plane Processor 206 may monitor the interface between Control Plane 201 and Forwarding Plane 204, maintain Binding Caches in shared space between Forwarding Plane Processor 206 and Fastpath Engines 207 (to enable Fastpath Engines 207 to perform appropriate routing of packets), and respond to various calls (e.g., AddBinding, DeleteBinding, PurgeBinding, and ActivateHA and/or DeactivateHA calls by manipulating shared variables between Forwarding Plane Processor 206 and Fastpath Engines 207) from Control Plane Processor 205. Forwarding Plane Processor 206 may additionally respond to Activate Proxy Neighbor Advertisement and Deactivate Proxy Neighbor Advertisement calls by turning on mechanisms to enable or disable Proxy Neighbor Advertisements for MN 140, respond to query calls, and/or invoke interface calls to register an interest in events.

In one embodiment, Fastpath Engines 207 may look up entries in Binding Caches when a packet is received, and if a binding entry is retrieved, decapsulate, re-encapsulate (if necessary) and forward the to its destination. If the packet is tunneled, Fastpath Engines 207 may look up the addresses of the inner and outer headers and decapsulate the tunneled packet if an entry is discovered. Fastpath Engines 207 may then look up the destination address of the decapsulated packet. If a binding entry is found, the packet may be re-encapsulated and forwarded it to its destination. Otherwise, the decapsulated packet may be forwarded directly to its destination. Additionally, in one embodiment, if a packet does not have a binding entry in the Binding Caches or if the packet is fragmented, Fastpath Engines 207 may pass the packet to the Forwarding Plane Processor 206, which in turn may process the passed packet or pass the packet to Control Plane Processor 205 for further processing (sometimes referred to as "exception processing").

Thus, for example, when a packet is received by HA 130, the packet may be received by Fastpath Engines 207. If the packet is simple (e.g., there is no encapsulation), then Fastpath Engines 207 may simply route the packet to its destination. If, however, the packet is more complex (e.g., the packet is encapsulated), Fastpath Engines 207 may look up the inner packet and outer addresses in the Binding Caches. If an entry is found, Fastpath Engines 207 may encapsulate the packet and forward it to its destination. If, however, no entry is found in the Binding Caches or the packet is fragmented, then further processing may be required and the packet may be transmitted to Forwarding Plane Processor 206, which in turn may process it or transmit the packet to Control Plane Processor 205. Control Plane Processor 205 may examine the packet, verify the packet, create a binding for the packet in a copy of the binding caches maintained by Control Plane Processor 205. Control Plane Processor 205 may additionally send an instruction to Forwarding Plane Processor 206 to add the binding into the binding caches maintained by Forwarding Plane Processor 206. The packet may then be transmitted back to Fastpath Engines 207 to be encapsulated and forwarded to its destination. For the purposes of this specification, the terms "encapsulate" and "tunnel" may be used interchangeably. Similarly, the terms "decapsulate" and "detunnel" may also be used interchangeably. These terms are well known to those of ordinary skill in the art and further description thereof is therefore omitted herein.

Figure 3:
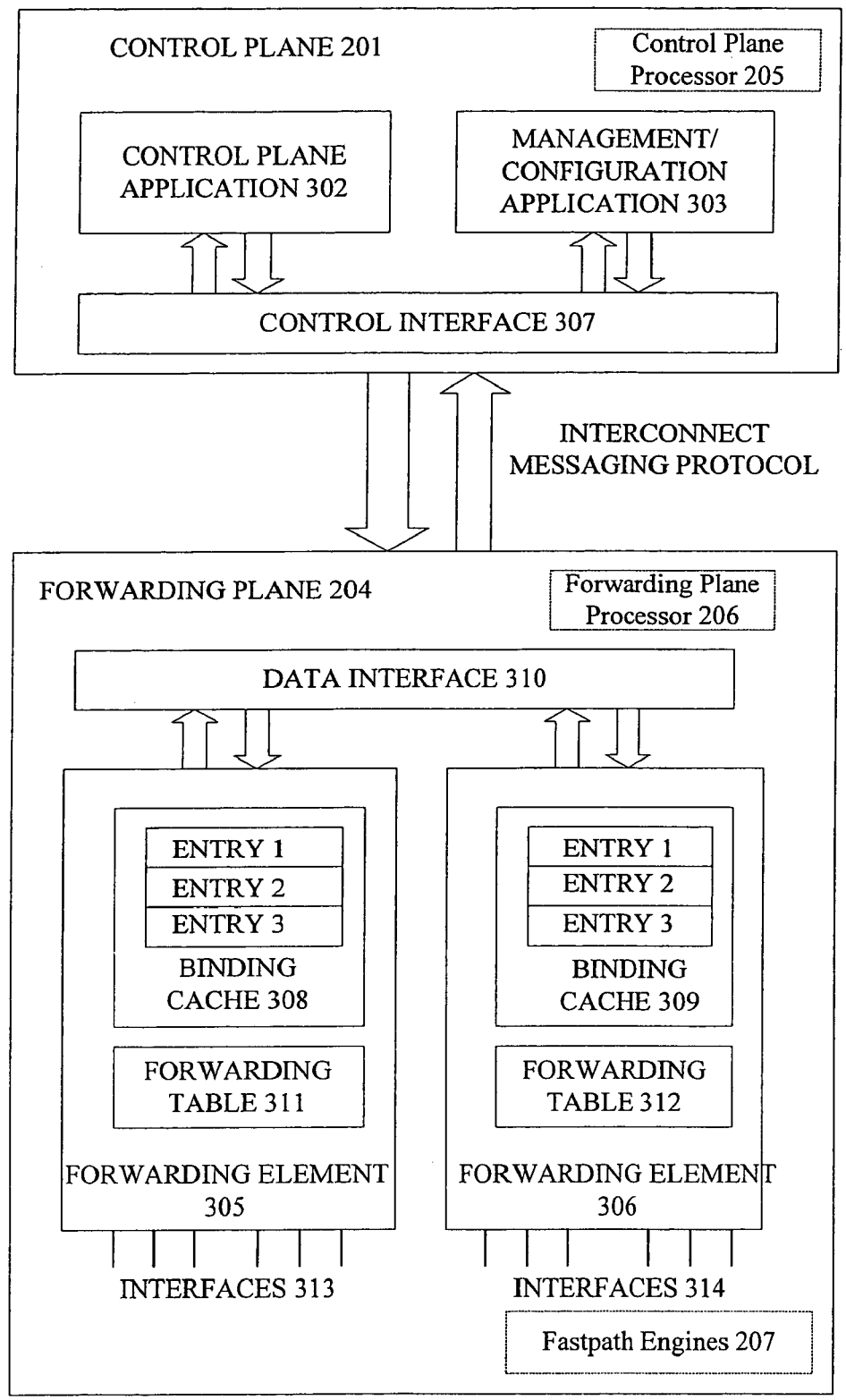
FIG. 3 illustrates an embodiment of the present invention in further detail.

FIG. 3 illustrates an embodiment of the present invention in further detail. For simplicity, only one control plane and one forwarding plane are illustrated, but embodiments of the present invention are not so limited. Instead, one control plane may manage one or more forwarding planes and one forwarding plane may service one or more control planes without departing from the spirit of embodiments of the present invention. As illustrated, Control Plane 201 (serviced by Control Plane Processor 205) may include all Mobile IP management applications (hereafter "Control Plane Applications 302") as well as all configuration applications (hereafter "Configuration Applications 303"). Forwarding Plane 204 may include all forwarding elements that route Mobile IP packets. Forwarding Plane 204 is illustrated as including both Forwarding Plane Processor 206 and Fastpath Engines 207. Finally, in order for Control Plane 201 to interface with Forwarding Plane 204, in one embodiment, HA 130 may include interface components in the control plane (hereafter "Control Interface 307") and the forwarding plane (hereafter "Data Interface 310"). Although Control Interface 307 and Data Interface 310 are illustrated conceptually as being within the same device as Control Plane 201 and Forwarding Plane 204 respectively, embodiments of the present invention are not so limited.

In an embodiment of the present invention, the functionality of Control Plane 201 and Forwarding Plane 204 are clearly delineated, and Control Interface 307 and Data Interface 310 enable Control Plane 201 and Forwarding Plane 204 to communicate and coordinate. According to one embodiment, the access to the Control Interface 307 comprises a set of Application Programming Interfaces ("APIs") that define how messages are passed between Control Plane 201 and Forwarding Plane 204. The APIs of Control Interface 306 may utilize a messaging protocol capable of exchanging information between the forwarding element and the control element. An example of such a messaging protocol is the "FORCES" protocol, which is described in further detail at www.ietf.org/html.charters/forces-charter.html. It will be readily apparent to those of ordinary skill in the art that other protocols may be utilized in order to achieve the same result. In order not to unnecessarily obscure embodiments of the present invention, further description of any specific messaging protocol is omitted herein.

Forwarding Plane 204 may include of one or more forwarding elements (Forwarding Elements 305 and 306, hereafter collectively "Forwarding Elements"), which in turn service one or more interfaces. In one embodiment, the Forwarding Elements include multiple entries in one or more binding caches (illustrated as "Binding Cache 308" and "Binding Cache 309", hereafter collectively "Binding Caches"). Each of the Forwarding Elements service one or more network interfaces (illustrated "Interface 313" and "Interface 314", hereafter collectively "Interfaces") that receive and forward packets. In one embodiment, mobile IP packets are received on any one of the Interfaces (e.g., on Forwarding Element 305) and are sent out via another one of the Interfaces on the same Forwarding Element. It will be readily apparent to one of ordinary skill in the art that the above description is merely an example and that the mobile IP packets may be received on any Interfaces on any of the Forwarding Elements and be sent out via any other of the Interfaces on the same Forwarding Elements.

In one embodiment, the Forwarding Element inspects an incoming packet's destination and/or source addresses and performs a lookup on the addresses in the binding cache associated with the interface. Thus, for example, if a packet is received on one of the Interfaces associated with Forwarding Element 305, Forwarding Element 305 may perform a lookup of the packet's destination address on its associated binding cache (e.g., Binding Cache 308). If an entry is found in Binding Cache 308, then Forwarding Element 305 may encapsulate the incoming packet to the destination specified in the binding cache. Forwarding Element 305 may also make a decision on which one of the Interfaces to send out the encapsulated packet, based on the information contained within a forwarding table (e.g., Forwarding Table 311). Forwarding Elements typically also act as routers, and forwarding tables (e.g., Forwarding Table 311 and Forwarding Table 312) within Forwarding Elements 203 may provide Forwarding Elements 203 with routing information. Packets may be received on one of the Interfaces residing in one Forwarding Element, and may go out on another of the Interfaces residing in the same Forwarding Element.

According to an embodiment, Control Plane Applications 302 and Configuration Applications 303 may use Control Interface 307 to add and delete bindings in the Binding Caches. In one embodiment, each Forwarding Element corresponds to an instantiation of Control Interface 307, enabling a developer to specify one of the Binding Caches in the Forwarding Element that corresponding to the binding update or other operation. Control Interface 307 additionally enables Control Plane 301 components (e.g., Control Plane Applications 302 and Configuration Applications 303) to query Forwarding Elements for the contents of the Binding Caches for specific Interfaces or addresses within Forwarding Plane 304.

In one embodiment, Control Interface 307 may be designed to be completely asynchronous in nature to support any kind of interconnect technology between Control Plane 201 and Forwarding Plane 204. For example, Control Plane 201 and Forwarding Plane 204 may reside on separate devices connected using Ethernet and/or fiber cables. Alternatively, Control Plane 201 and Forwarding Plane 204 may reside on a single device and may be connected via bus technology such as CompactPCI, or inter-process communication.

Figure 4:
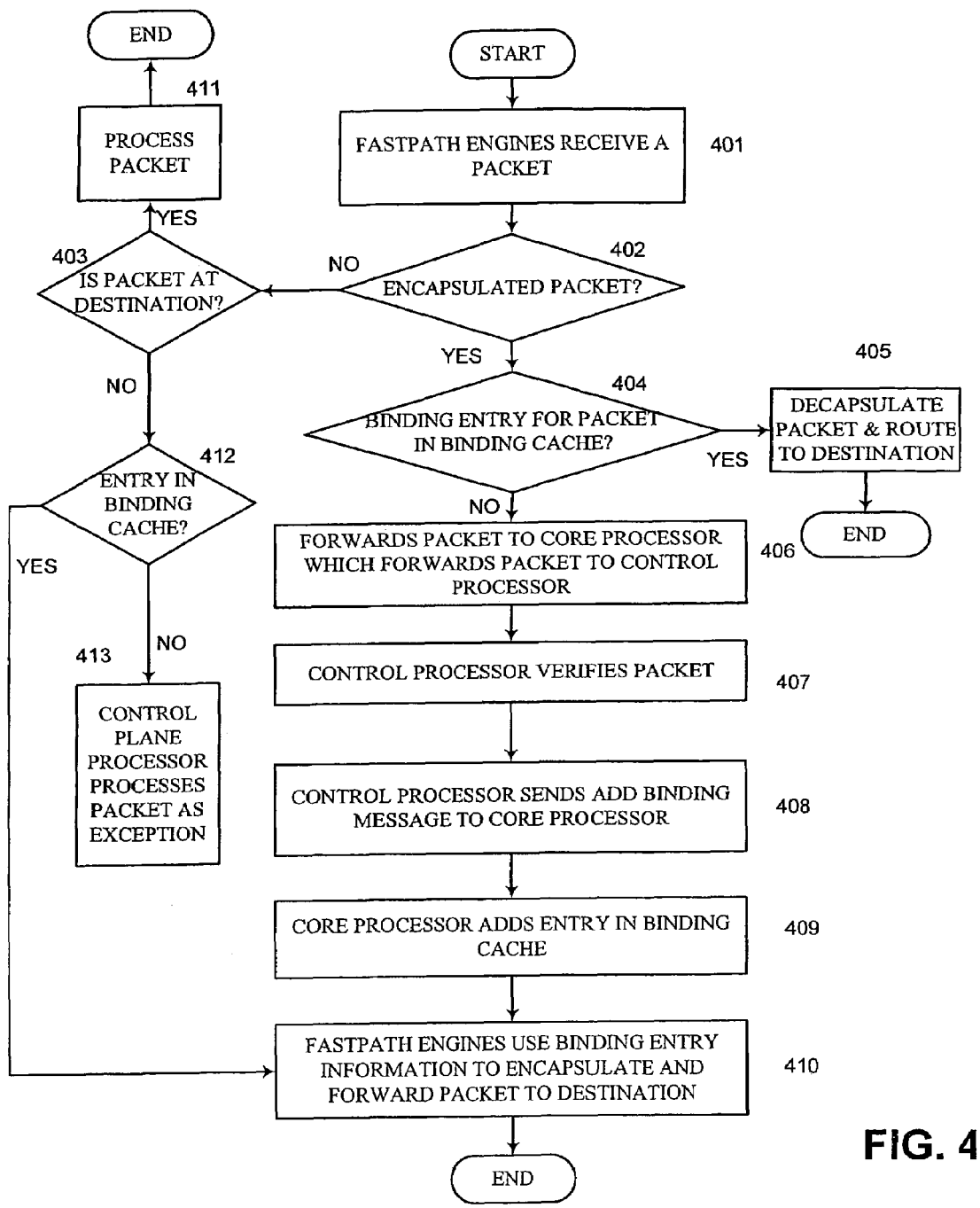
FIG. 4 is a flow chart illustrating how a packet may be routed according to an embodiment of the present invention.

FIG. 4 is a flow chart illustrating how a packet may be processed according to an embodiment of the present invention. Although the following operations may be described as a sequential process, many of the operations may in fact be performed in parallel or concurrently. In addition, the order of the operations may be re-arranged without departing from the spirit of embodiments of the invention. In 401, an IP packet may be received by Fastpath Engines 207 in Forwarding Plane 204. The packet may be examined in 402 to determine if it is a tunneled (encapsulated) packet. If the packet is not tunneled, Fastpath Engines 207 may look for a binding entry in the binding cache, and route the packet to its destination address (either based on the binding cache entry or, if one does not exist, directly to the address specified in the packet). More specifically, in 403, the packet may be examined to determine if it is at its destination address (i.e., if the packet is addressed to HA 130). If it is, in 411, the packet may be processed locally by HA 130. If, however, the destination address is not HA 130, in 412, Fastpath Engines 207 may look for a binding entry in the binding cache. If a binding entry exists, Fastpath Engines 207 may route the packet to its destination address in 410. If a binding entry does not exist, Control Plane Processor 205 may handle the packet as an exception in 413. This represents the simplest routing functionality that may be performed by HA 130.

If, however, the packet is encapsulated, Fastpath Engines 207 may examine the inner and outer packet headers and look up the Binding Caches in 404 to determine if a binding entry exists. If a binding entry exists, then in 405, the packet is decapsulated, re-encapsulated (if necessary), and forwarded to its destination. If, however, a binding entry does not exist in the Binding Caches, then the packet is forwarded in 406 to Forwarding Plane Processor 206 which in turn forwards the packet to Control Plane Processor 205. Control Plane Processor 205 verifies the packet in 407 and in 408, Control Plane Processor 205 may send an API call to Forwarding Plane Processor 206 to add the binding to Binding Caches. In 409, Forwarding Plane Processor 206 adds a binding in the Binding Caches in response to the API call. Fastpath Engines 207 may then use the binding information in the Binding Caches in 410 to encapsulate the packet and route it to its proper destination address (COA).

Figure 5:
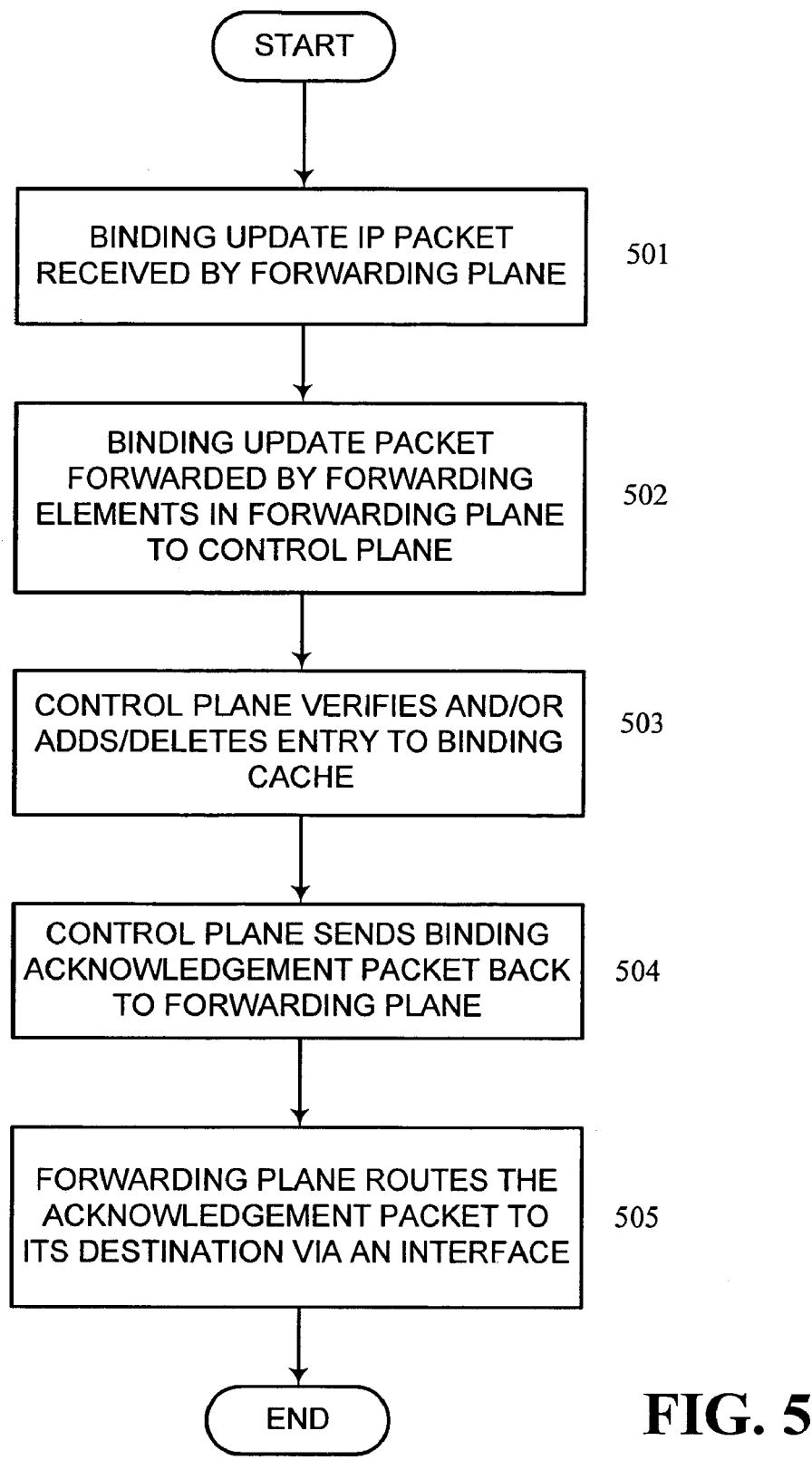
FIG. 5 is a flow chart illustrating the location management or binding update procedure according to an embodiment of the present invention.

In addition to the operations described above, various packets may also be received by HA 130 from roaming mobile nodes to inform HA 130 of its current COA. These packets may be used to continuously update the Binding Caches with current COAs for the mobile nodes. FIG. 5 is a flow chart illustrating the location management or binding update procedure according to an embodiment of the present invention. Although the following operations may be described as a sequential process, many of the operations may in fact be performed in parallel or concurrently. In addition, the order of the operations may be re-arranged without departing from the spirit of embodiments of the invention. In 501, a binding update packet destined for HA 130 is received by Fastpath Engine 207 on Forwarding Plane 204, and in 502, Forwarding Plane Processor 206 in Forwarding Plane 204 forwards the packet to Control Plane Processor 205 in Control Plane 201. Control Plane Processor 205 verifies the binding updates and/or adds/deletes the entries into the Binding Caches in 503, and in 504, the binding acknowledgement packet generated by Control Plane Processor 205 may be sent back to Forwarding Plane Processor 206. In 505, Forwarding Plane Processor 206 may route the acknowledgement packet to its destination via Fastpath Engine 207 (i.e., via one of the interfaces in Forwarding Plane 204).

According to embodiments of the present invention, the control and forwarding plane components of HA 130 may be physically separated, e.g., on separate devices, or may reside on a single device. Embodiments including a physical separation of the control plane and forwarding plane elements may provide significant benefits. For example, the decomposition of functionality into control plane and forwarding plane functionality enables device vendors to specialize in one or the other of the planes. More specifically, device vendors may design and market control plane devices and/or forwarding plane devices, without any concern for interoperability. Instead, interoperability between the planes may be achieved via a standard interface, as described in further detail below. Each device may be optimized for the specific tasks within one of the control plane and/or the forwarding plane.

An embodiment of the present invention may also enable a highly scalable network. In a current network, in order to increase throughput, a network administrator would be forced to add additional home agents, regardless of the fact that the network only requires additional routing capacity and has adequate management capacity. In embodiments of the present invention, however, the decomposition of functionality enables increased flexibility in mixing and matching both Control Plane and Forwarding Plane devices on a network. In other words, a Control Plane component from Vendor A may seamlessly control functionality in a Forwarding Plane component from Vendors B and C. This achieves vendor independence, which in turn results in quicker time to market, efficiency, lower cost, and greater innovation. Moreover, the ability to add Forwarding Planes elements driven off the same Control Plane element(s) enables scalability and capacity enhancement in the field. Embodiments of the present invention are additionally easily adaptable to changing network conditions. For example, when networks migrate from Asynchronous Transfer Mode ("ATM") to 10 Gigabit Ethernet, only minor modifications to the Forwarding Plane device may be necessary.

In an alternate embodiment, the separation of the control plane and forwarding plane may be purely conceptual, i.e., elements for both planes may exist within a single device. This embodiment may fall short of the degree of optimization that may be achieved in embodiments wherein the elements for each plane exist on separate devices. Nonetheless, the delineation of functionality of each plane may enable a device vendor to ensure that each of the elements within the device is configured for specific functionality. The delineation of functionality therefore, even in the absence of a physical separation of functionality, may boost the device's performance, and increase the network's efficiency and performance.

HA 130 may therefore comprise one or more devices. As described above, in an embodiment wherein HA 130 comprises more than one device, each device may be configured to perform tasks for specific functionality, e.g., one device for control plane functionality and one or more devices for forwarding plane functionality. If provided by a single device, on the other hand, the control plane and forwarding plane tasks may also be performed by different physical elements within the device. In either embodiment, in order for the elements to communicate with each other, and to coordinate the control plane and forwarding plane tasks, embodiments of the invention may include an interface between the elements. The interface must be vendor independent for interoperability between control plane devices and forwarding plane devices, in particular when the devices are from different vendors.

The mobile nodes and other devices according to embodiments of the present invention may be implemented on a variety of data processing devices. It will be readily apparent to those of ordinary skill in the art that these data processing devices may include various software, and may comprise any devices capable of supporting mobile networks, including but not limited to mainframes, workstations, personal computers, laptops, portable handheld computers, personal digital assistants and/or cellular telephones.

According to embodiment of the present invention, data processing devices may include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores information in any form accessible by a data processing device, the machine-accessible medium including but not limited to, recordable/non-recordable media (such as read only memory (ROM), random access memory (RAM), magnetic disk storage media, optical storage media and flash memory devices).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A network device for routing mobile IP packets, the network device comprising:
   a control plane processor;
   a forwarding plane processor coupled to the control plane processor, the forwarding plane processor to maintain a binding cache to associate original destination addresses with respective replacement destination address, based on information obtained from one or more routers, the forwarding plane processor also to maintain a forwarding table to associate destination addresses with output interfaces of the network device; and
   a fastpath engine responsive to the control plane processor, the fastpath engine capable of operations comprising:
      receiving, a mobile IP packet addressed to a destination address;
      looking for the destination address of the mobile IP packet in the binding cache to determine if an entry exists to associate a replacement destination address with the destination address for the mobile IP packet;
      encapsulating the mobile IP packet to the replacement destination address, in response to finding the entry for the mobile IP packet in the binding cache;
      looking for the replacement destination address in the forwarding table, to determine if an entry exists to associate an output interface with the replacement destination address;
      forwarding the encapsulated mobile IP packet to the replacement destination address obtained from the binding cache, via the output interface obtained from the forwarding table; and
      routing the mobile IP packet to the forwarding plane processor, in response to finding no entry for the mobile IP packet in the binding cache;
   wherein the forwarding plane processor is capable of routing the mobile IP packet to the control plane processor; and
   the control plane processor is capeable of instructing the forwarding plane processor to add an entry for the mobile IP packet to the binding cache maintained by the forwarding plane processor.

2. The network device according to claim 1 wherein the fastpath engine comprises software to execute on the forwarding plane processor.

3. The network device according to claim 1 wherein the control plane processor is capable of verifying the mobile IP packet.

4. The network device according to claim 3 wherein the control plane processor is farther capable of:
   adding entries to a copy of the binding cache;
   deleting entries from the copy of the binding cache;
   initiating and aborting proxy neighbor advertisements in response to additions to and deletions from the binding cache;
   performing security functions;
   performing discovery functions; and
   performing management functions.

5. The network device according to claim 1 wherein the mobile IP packet is encapsulated and the entry in the binding cache corresponds to a destination specified by an inner portion of the mobile IP packet.

6. The network device according to claim 5 wherein the fastpath engine is further capable of decapsulating the mobile IP packet and forwarding the decapsulated mobile IP packet to the destination.

7. The network device according to claim 1 wherein the forwarding plane processor is further capable of:
   monitoring an interface between the forwarding plane processor and the control plane processor;
   responding to activate neighbor proxy advertisement and deactivate neighbor proxy advertisement calls; and
   maintaining the binding cache by responding to instructions from the control plane processor to
   add bindings to the binding cache,
   delete bindings in the binding cache,
   purge bindings in the binding cache, and
   activate and deactivate the network device.

8. A method of routing mobile IP packets, comprising:
   maintaining, by a forwarding plane processor in a network device, a binding cache in the network device and a forwarding table in the network device, wherein the binding cache associates original destination addresses with respective replacement destination address, based on information obtained from one or more routers, and the forwarding table associates destination addresses with output interfaces of the network device;

performing, by a fastpath engine of the network device, operations comprising:
  receiving a mobile IP packet addressed to a destination address;
  looking for the destination address of the mobile IP packet in the binding cache to determine if an entry exists to associate a replacement destination address with the destination address for the mobile IP packet;
  encapsulating the mobile IP packet to the replacement destination address, in response to finding the entry for the mobile IP packet in the binding cache;
  looking for the replacement destination address in the forwarding table, to determine if an entry exists to associate an output interface with the replacement destination address;
  forwarding the encapsulated mobile IP packet to the replacement destination address obtained from the binding cache, via the output interface obtained from the forwarding table; and
  routing the mobile IP packet to the forwarding plane processor, in response to finding no entry for the mobile IP packet in the binding cache;
routing the mobile IP packet from the forwarding plane processor to a control plane processor; and
from the control plane processor, instructing the forwarding plane processor to add an entry for the mobile IP packet to the binding cache.

9. A method according to claim 8, wherein the fastpath engine comprises software to execute on the forwarding plane processor.

10. A method according to claim 8, further comprising:
the control plane processor verifying the mobile IP packet.

11. A method according to claim 10, wherein the control plane processor performs further operations comprising:
adding entries to a copy of the binding cache;
deleting entries from the copy of the binding cache;
initiating and aborting proxy neighbor advertisements in response to additions to and deletions from the binding cache;
performing security functions;
performing discovery functions; and
performing management functions.

12. A method according to claim 8, wherein the mobile IP packet is encapsulated and the entry in the binding cache corresponds to a destination specified by an inner portion of the mobile IP packet.

13. A method according to claim 12, further comprising:
the fastpath engine decapsulating the mobile IP packet and forwarding the decapsulated mobile IP packet to the destination.

14. A method according to claim 8, wherein the forwarding plane processor performs further operations comprising:
monitoring an interface between the forwarding plane processor and the control plane processor;
responding to activate neighbor proxy advertisement and deactivate neighbor proxy advertisement calls; and
maintaining the binding cache by responding to instructions from the control plane processor to
add bindings to the binding cache,
delete bindings in the binding cache,
purge bindings in the binding cache, and
activate and deactivate the network device.

15. An article, comprising a machine-accessible medium having stored thereon instructions that, when executed by a network device, cause the network device to perform operations comprising:
maintaining, by a forwarding plane processor in the network device, a binding cache in the network device and a forwarding table in the network device, wherein the binding cache associates original destination addresses with respective replacement destination address, based on information obtained from one or more routers, and the forwarding table associates destination addresses with output interfaces of the network device;
performing, by a fastpath engine of the network device, operations comprising:
  receiving a mobile IP packet addressed to a destination address;
  looking for the destination address of the mobile IP packet in the binding cache to determine if an entry exists to associate a replacement destination address with the destination address for the mobile IP packet;
  encapsulating the mobile IP packet to the replacement destination address, in response to finding the entry for the mobile IP packet in the binding cache;
  looking for the replacement destination address in the forwarding table, to determine if an entry exists to associate an output interface with the replacement destination address;
  forwarding the encapsulated mobile IP packet to the replacement destination address obtained from the binding cache, via the output interface obtained from the forwarding table; and
  routing the mobile IP packet to the forwarding plane processor, in response to finding no entry for the mobile IP packet in the binding cache;
routing the mobile IP packet from the forwarding plane processor to a control plane processor; and
from the control plane processor, instructing the forwarding plane processor to add an entry for the mobile IP packet to the binding cache.

16. An article according to claim 15, wherein the instructions implement a fastpath engine to execute on the forwarding plane processor.

17. An article according to claim 15, wherein the operations further comprise:
the control plane processor verifying the mobile IP packet.

18. An article according to claim 17 wherein the instructions cause the control plane processor to perform operations comprising:
adding entries to a copy of the binding cache;
deleting entries from the copy of the binding cache;
initiating and aborting proxy neighbor advertisements in response to additions to and deletions from the binding cache;
performing security functions;
performing discovery functions; and
performing management functions.

19. An article according to claim 15, wherein the mobile IP packet is encapsulated and the entry in the binding cache corresponds to a destination specified by an inner portion of the mobile IP packet.

20. An article according to claim 19, wherein the operations further comprise:
the fastpath engine decapsulating the mobile IP packet and forwarding the decapsulated mobile IP packet to the destination.

21. An article according to claim 15, wherein the instructions cause the forwarding plane processor to perform operations comprising:

monitoring an interface between the forwarding plane processor and the control plane processor;
responding to activate neighbor proxy advertisement and deactivate neighbor proxy advertisement calls; and
maintaining the binding cache by responding to instructions from the control plane processor to
add bindings to the binding cache,
delete bindings in the binding cache,
purge bindings in the binding cache, and
activate and deactivate the network device.

* * * * *